Patented Aug. 10, 1948

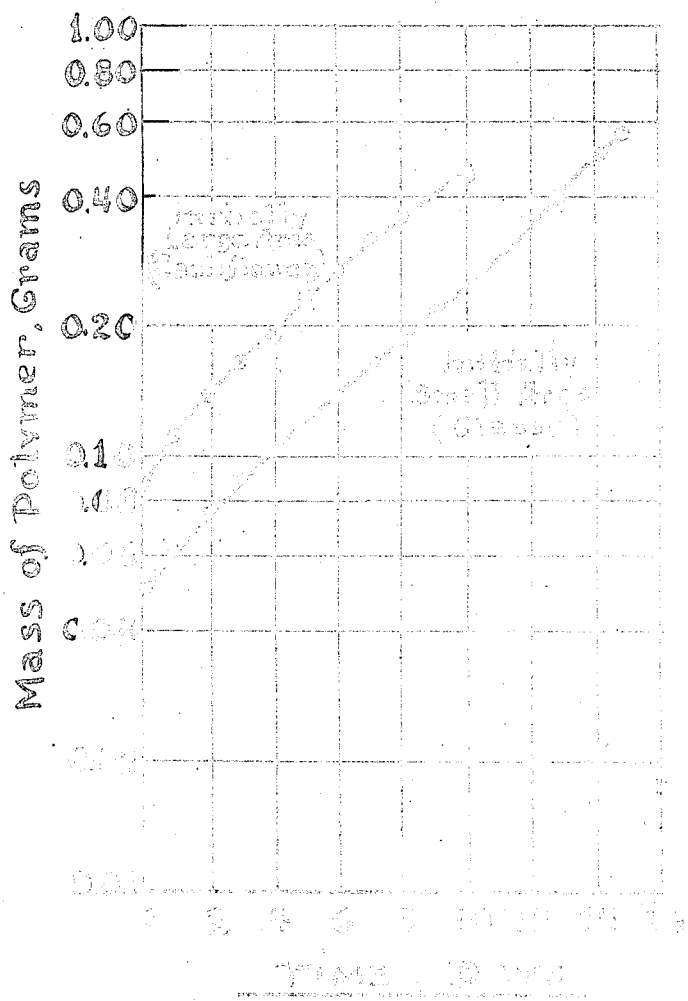

2,446,969

UNITED STATES PATENT OFFICE 2,446,969

INHIBITION OF DIOLEFIN POLYMER GROWTH

Lester Marshall Welch, Madison, and Samuel B. Lippincott, Westfield, N. J., assignors to Standard Oil Development Company, a corporation of Delaware Application August 14, 1946, Serial No. 690,558

6 Claims. (Cl. 260—666.5)

This invention relates to a process for inhibiting or minimizing the formation and/or growth of semi-solid and solid resins during the separation and segregation of diolefins from other hydrocarbons. It is also generally applicable to operations in which diolefinic hydrocarbons are handled.

In the separation and segregation of diolefins from other hydrocarbons by absorption, desorption and distillation, various types of polymers are formed, that is, dimers, viscous high-molecular-weight polymers and semi-solid or resinous solid polymers. The dimers and viscous, high-molecular-weight polymers are generally soluble in the diolefin itself or other hydrocarbons and, in certain cases, are depolymerized on heating to the original diolefin. On the other hand, the solid polymers of the type which have been referred to as "cauliflower" or "popcorn" polymers because of the resemblance, are quite insoluble in the diolefin and other hydrocarbons, are generally infusible and, when in contact with a monomer, continue to grow. As a result of such growth distillation columns and other plant equipment become filled with the solid polymer with a resultant interference with operation of the still and other equipment. The insidious character of this polymer lies in the fact that it is insoluble in all solvents and cannot be completely eliminated from equipment by mechanical means so that in a short time fouling and plugging troubles reoccur. Even though the complete equipment is thoroughly cleaned, it is only a matter of time before residual particles of polymer will grow sufficiently to foul and plug the equipment. Two remedies were suggested, one to inhibit the initial formation of the self-propagating solid polymer and second to control or stop the growth of preformed particles. Generally the initial growth is found in most equipment and since this is so, means for controlling or stopping the growth of the preformed polymer is very desirable.

An object of this invention is to inhibit or stop the growth of a preformed self-propagating polymer. Various factors are considered to effect the growth of this resinous solid polymer. The presence of active oxygen (peroxides) in a diolefin such as liquid butadiene is believed to initiate the growth of a resinous solid popcorn polymer. Small amounts of air present in the system are a potential source of active oxygen. Other factors aiding the initiation of resinous solid polymer are the presence of active oxygen with unpolished iron, rusty iron, certain other metals and an interface of liquid water. Rusty iron with water in the absence of air and/or peroxides was very effective in initiating popcorn polymer formation.

For example, the resinous solid polymers of the popcorn variety due to their physical appearance, comprise small glassy lumps surrounded by finer granular clinging masses possessing some rubbery properties. This glassy material, despite its appearance, exhibits considerable rubber-like rebound when dropped on a hard surface. It is infusible and cannot be molded even at 150° C. It is insoluble in ordinary solvents such as benzene, carbon tetrachloride, and methyl ethyl ketone. It exhibits a slight solubility in hot xylene and a solution in xylene shows the presence of peroxides. Elemental analysis was 88.77% carbon and 11.27% hydrogen, corresponding closely to the formula $(C_4H_6)_x$.

On standing, the polymer undergoes degradation and yellowing, apparently as the result of contact with air. After exposing a sample for two months in air, elemental analysis became 84.79% carbon, 10.72% hydrogen, total 95.5%; the difference probably represents oxygen absorbed (peroxides, etc.) Absorption of oxygen tends to reduce the rate of self-propagation of the polymer.

Popcorn polymer of butadiene does not grow at a constant rate in contact with monomer, but rather propagates at a constantly accelerating rate, indicating that additional points of growth are continuously formed as the mass increases. A fresh supply of active oxygen, which is apparently necessary for the initiation of popcorn polymer, is not required for its subsequent growth.

The rate of growth of two resinous polymer seeds in butadiene vapor at 60° C. is shown in the figure. Although the initial seeds were radically different in physical form, the growth followed much the same pattern. Practically linear curves of identical slopes were obtained when the logarithm of the mass was plotted against time.

Laboratory experiments show that the logarithm of the mass in growth varies linearly with time, then $$\ln w = kt + c$$

which corresponds to the following differential growth equation:

$$\frac{dw}{dt} = kw$$

where $w$=mass, $t$=time, and $k$ and $c$ are constants. The fact that the rate is first order with respect to the mass is interpreted to mean that all portions of the polymer are in active growth and are accessible to the monomer probably as the result of permeation of the polymer by diolefin vapor or liquid. Visual observation shows that if a solid seed is exposed to diolefin vapor, it first swells, then cracks, and finally subdivides into fine granules. The granular mass continues to grow as long as monomeric vapor is supplied. If the polymer is confined in a space insufficient to accommodate the growing polymer, high pressures are built up in the vessel. Steel condensers on distillation towers have been ruptured by this process. A few tests of the polymer growth in the liquid phase gave approximately the same rate of growth as in the vapor phase.

It has been customary to inhibit polymerization of diolefins by adding small amounts of antioxidant inhibitors to the monomer. It has been found that this technique is virtually ineffective in inhibiting the growth of preformed popcorn polymers even when large amounts of inhibitor are employed. This invention comprises removing the monomer from the equipment or apparatus and heating all surfaces likely to harbor particles of the polymer with a selected treating agent which may comprise a gas or vapor.

The treating agent used according to this invention is a volatile oxime.

Before a detailed description of the treatment is used, it should be observed that the absolute rate of growth is affected by (1) the degree of oxidation of the seed—that is, the length of time of exposure to air, and (2) the size of the seed treated as it reflects the degree of penetration of the treating agent. The apparent tendency of different seeds to grow at different rates has been corrected for by growing a blank seed from the same parent with each "family" of seeds.

The oximes as a class are very effective in inhibiting popcorn polymer growth. The effectiveness of the oxime group is retained with various molecular substituents, as with quinone dioxime, acetoxime and butyraldoxime. These lower oximes have the advantage of being steam-volatile and effective in vapor-phase treatment. The acetoxime treated seed which grew at a relative rate of 5% for the first six days, had an overall rate of growth for the ensuing 13 days of 25%. It was observed that the seed began to cauliflower after the 13th day which probably accounts for the higher rate of growth in the latter part of the run. The possibility cannot be ignored that the inhibition of these seeds by such treatment merely delays the point of rapid sub-division and does not destroy completely the self-propagating nature of the polymer. The polymer seed was relatively large, however, in this case and it is likely that the percentage of mass effectively treated was rather small. Smaller seeds would probably be more effectively treated.

For example, a distillation tower, during the period of plant down time, after the monomer is removed, is deactivated by distilling a volatile oxime, such as acetoxime, through the tower to inhibit polymer growth. Butyraldoxime may likewise be used as a liquid or vapor to treat the seed tower. Acetone solutions of acetoxime may also be used.

The following table shows the effect of using vapors of oximes in treating butadiene distillation towers containing the seeds of the polymers.

*Growth of butadiene popcorn polymer in saturated butadiene vapor at 60° C. after various treatments*

| | Wt. of Seed, Grams | | | Duration, days | Growth, wt. per cent per mo.[1] | | Per Cent Residual Activity A/B×100 |
|---|---|---|---|---|---|---|---|
| | Initial | Final | Gain | | Treated Seed | Untreated Seed | |
| Acetoxime—steam vapors | 0.0086 | 0.0073 | −0.0013 | 8 | (0) | 2,950 | 0 |
| Acetoxime–vapor | 0.0477 | 0.0575 | 0.0098 | 6 | 167 | 89,700 | 0.187 |
| Butyraldoxime—vapor | 0.0363 | 0.0379 | 0.0016 | 8 | 17 | 5,000 | 0.34 |

[1] The growth expressed as weight per cent per month is obtained by extrapolating along a straight line from the actual duration of the test to a month's duration on plot of log mass of seed versus time.

We claim:

1. The process for handling diolefins normally tending to form insoluble self-propagating polymers which eventually plug the handling equipment comprising handling said diolefins until a small amount of said self-propagating polymer is formed, removing the diolefins from the polymer, treating the said polymer in the absence of said diolefin with a vapor containing an oxime whereby the further growth of said polymer is inhibited and then recontacting the diolefin with treated polymer.

2. The process for handling butadiene normally tending to form insoluble self-propagating polymers which eventually plug the handling equipment comprising handling said butadiene until a small amount of said self-propagating polymer is formed, removing the butadiene from the polymer, treating the said polymer in the absence of said butadiene with a vapor containing an oxime whereby the further growth of said polymer is inhibited and then recontacting the butadiene with the treated polymer.

3. The process for handling butadiene normally tending to form insoluble self-propagating polymers which eventually plug the handling equipment comprising handling said butadiene until a small amount of said self-propagating polymer is formed, removing the butadiene from the polymer, treating the said polymer in the absence of butadiene with steam containing an oxime vapor whereby the further growth of said polymer is inhibited and then recontacting the butadiene with the treated polymer.

4. The process according to claim 2 in which the oxime used is quinone dioxime.

5. The process according to claim 2 in which the oxime is acetoxime.

6. The process according to claim 2 in which the oxime used is butyraldoxime.

LESTER MARSHALL WELCH.
SAMUEL B. LIPPINCOTT.

REFERENCES CITED

The following references are of record in the file of this patent:

UNITED STATES PATENTS

| Number | Name | Date |
|---|---|---|
| 2,228,487 | Reynolds, Jr., et al. | Jan. 14, 1941 |
| 2,402,113 | Hatch et al. | June 11, 1946 |
| 2,402,806 | Durland | June 25, 1946 |